United States Patent [19]

Dohrendorf

[11] Patent Number: 4,590,735
[45] Date of Patent: May 27, 1986

[54] VERTICAL PACKAGING MACHINE
[75] Inventor: Hans A. Dohrendorf, Anderson, S.C.
[73] Assignee: Nordson Corporation, Amherst, Ohio
[21] Appl. No.: 662,278
[22] Filed: Oct. 18, 1984
[51] Int. Cl.⁴ .................. B65B 9/08; B65B 57/00
[52] U.S. Cl. ........................................ 53/77; 53/552
[58] Field of Search ............. 53/552, 551, 550, 451, 53/450, 77; 156/515; 493/38

[56] References Cited
U.S. PATENT DOCUMENTS

| | | | |
|---|---|---|---|
| 3,282,020 | 11/1966 | Smith | 53/551 |
| 3,340,129 | 9/1967 | Grevich | 156/498 |
| 3,364,650 | 1/1968 | House | 53/568 |
| 3,449,889 | 6/1969 | Molitor, Jr. | 53/568 |
| 3,579,404 | 5/1971 | Spitznagel | 156/515 |
| 3,721,801 | 3/1973 | Bate | 53/550 X |
| 4,235,064 | 11/1980 | Wenger | 53/552 X |

Primary Examiner—James F. Coan
Attorney, Agent, or Firm—Wood, Herron & Evans

[57] ABSTRACT

A vertical packaging machine having a supply of film folded upon itself, the film passing between two jaws pivoted at their lower ends. One of the jaws has a thin, L-shaped knife which is resistance-heated. The jaws clamp the film and the knife cuts and seals the film transversely and vertically along the free edges of the film to enclose an article within the package.

9 Claims, 12 Drawing Figures

VERTICAL PACKAGING MACHINE

This invention relates to a vertical packaging machine or bagger.

In a vertical bagger, a film, folded upon itself, from a supply roll is passed vertically between clamping jaws, one of which carries an inverted L-shaped hot knife. The jaws clamp the film. The hot knife makes a vertical cut along the free edges of the film, thereby forming a vertical seal and makes a transverse cut which also forms a top seal on a lower package and a bottom seal on the adjacent upper package. An operator inserts product between the free edges of the upper package, the product resting on the bottom seal. The film is then advanced to lower the upper package with the product contained in it between the jaws. There the clamping, cutting and sealing is repeated. In this manner, up to about thirty packages per minute are formed.

One form of such vertical packaging apparatus has been manufactured and sold for about thirty years. That apparatus has had massive jaws slidably-mounted by bushings on hardened shafts. Large pistons in 2.5" cylinders driven by air at 80 psi have been employed to clamp the film. The structure itself weighs about 250 pounds. One cubic foot of air at 80 psi is required to make thirteen packages.

Carried by one of the jaws is a hot knife having a horizontal blade and a vertical blade, the blades being ⅛" thick. Each blade has a 1500 watt heating element mounts on it to raise the temperature of the blade sufficiently high to permit the cutting and sealing of the bags.

While performing satisfactorily to make packages, this machine has had several disadvantages.

The weight of the jaws and the complexity of the mechanism to operate the jaws and knife is expensive.

Maintenance is expensive. When a knife heater burns out, approximately three hours is required to take the apparatus apart to replace the heater and realign the mechanism.

A significant amount of energy is wasted. The machine requires over 3000 watts for its operation, most of the wattage being applied to the heating of the knives. Actually very little wattage is required for the cutting and sealing of the film and, hence, the excess wattage is simply radiated into the atmosphere and wasted.

Large quantities of compressed air and hence a sizeable compressor is required to drive the large pistons at 80 psi.

The cutting and sealing operation is effected by the actual burning away of the film under the ⅛" thick edge of the heated knife. With each bag-making operation, several square inches of film must be burned and the smoke from that burning must be carried away through a venting structure.

It has been an objective of the invention to provide an improved vertical packaging machine wherein the disadvantages referred to above have been greatly reduced.

This objective of the invention has been attained by providing a clamping jaw and sealing frame which are pivotally mounted at their lower ends, thereby eliminating the hardened shafts and bearings previously used for mounting the jaws. The pivoted jaws can be manufactured from aluminum, thereby further reducing the weight of the assembly.

A thin (0.015") knife is mounted on the sealing frame. Rather than using heating elements to heat the knife, current is passed directly through the knife, thereby heating it through resistance-heating. Two transformers, one for each knife, are provided since it has been determined that cutting and sealing of the film in the vertical direction requires greater energy than the cutting and sealing of the film in the transverse direction.

Further, the knife is shaped at its upper corner with a lateral extension, thereby providing assurance of a complete severing of each package and eliminating any problem arising out of the tendency of the film to drift laterally, which in turn causes misalignment of the vertical cuts formed in the film.

Another feature of the invention consists of the provision of a safety bar slidably-mounted along the top edges of the clamping jaws. If the safety bar strikes the hand of the operator, a proximity switch is instantly actuated and the air to the pistons operating the jaws is reversed to open the jaws and prevent injury.

Because of the lightweight construction, the pistons which drive the clamping jaws are mounted in 1.125" cylinders having about one-fifth the cross-sectional area of the cylinders previously used. Furthermore, the air to drive them is at 40 psi which is half the pressure used in the previous construction.

The air required to operate the pistons is also significantly reduced in that seventy-five bags can be formed with a cubic foot of air at 40 psi as contrasted to the thirteen bags at 80 psi.

Another feature of the invention is the manner in which the knife is mounted on the sealing frame, the knife being put in tension by a compression spring so as to accommodate thermal expansion of the knife without warping when the knife is heated.

By heating the knife directly through resistance-heating, the energy required is significantly reduced, the overall machine requiring about 310 watts as contrasted to the 3100 watts of the prior machine.

Time for maintenance has also been significantly reduced. Approximately twenty minutes is required to make a knife change as contrasted to the three hours required in the previous machine.

The several objectives, features and advantages of the present invention will become more readily apparent from the following detailed description taken in conjunction with the accompanying drawings in which.

GENERAL ORGANIZATION AND OPERATION

Figure 1:
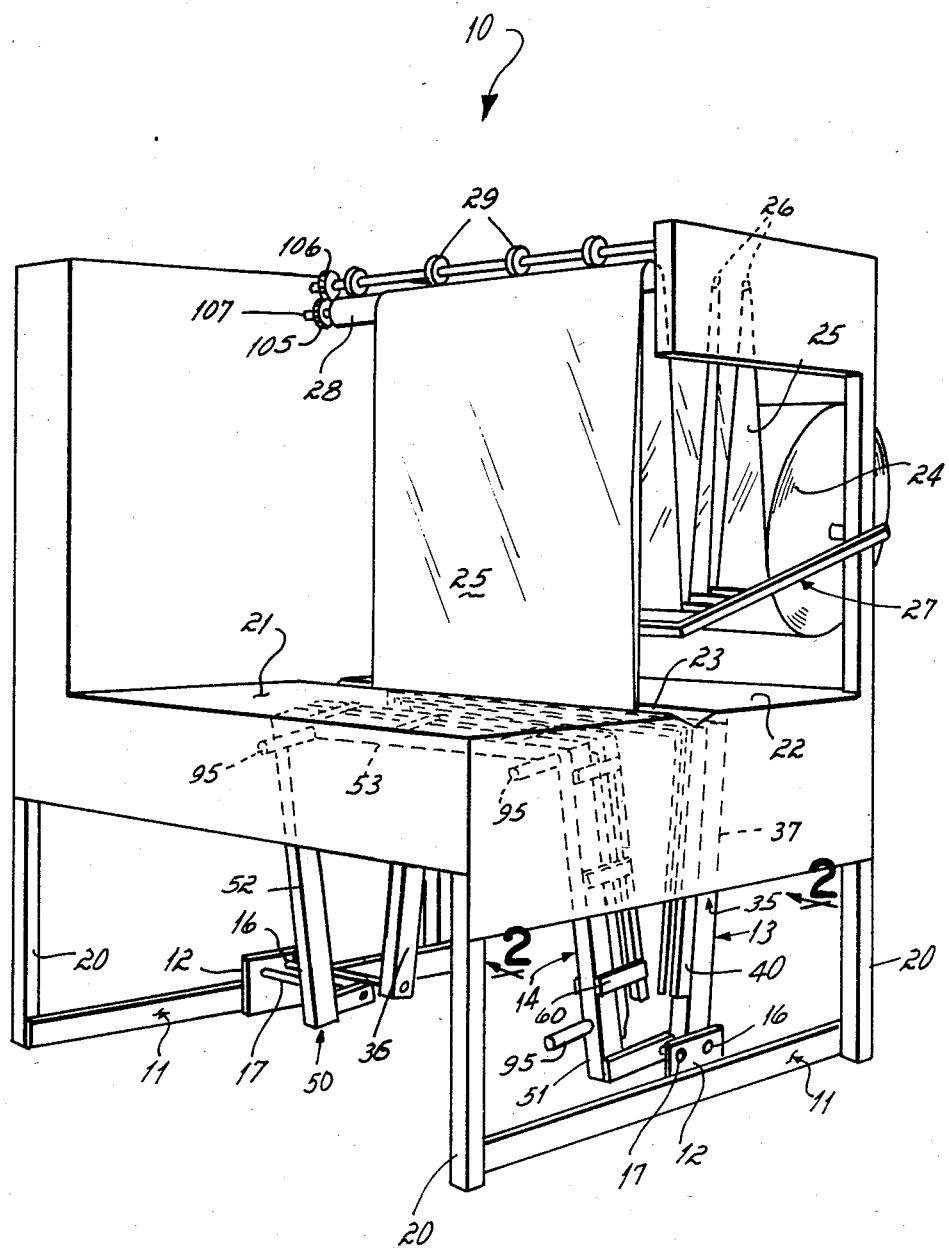
FIG. 1 is a perspective view of the machine formed in accordance with the present invention.
Figure 3:
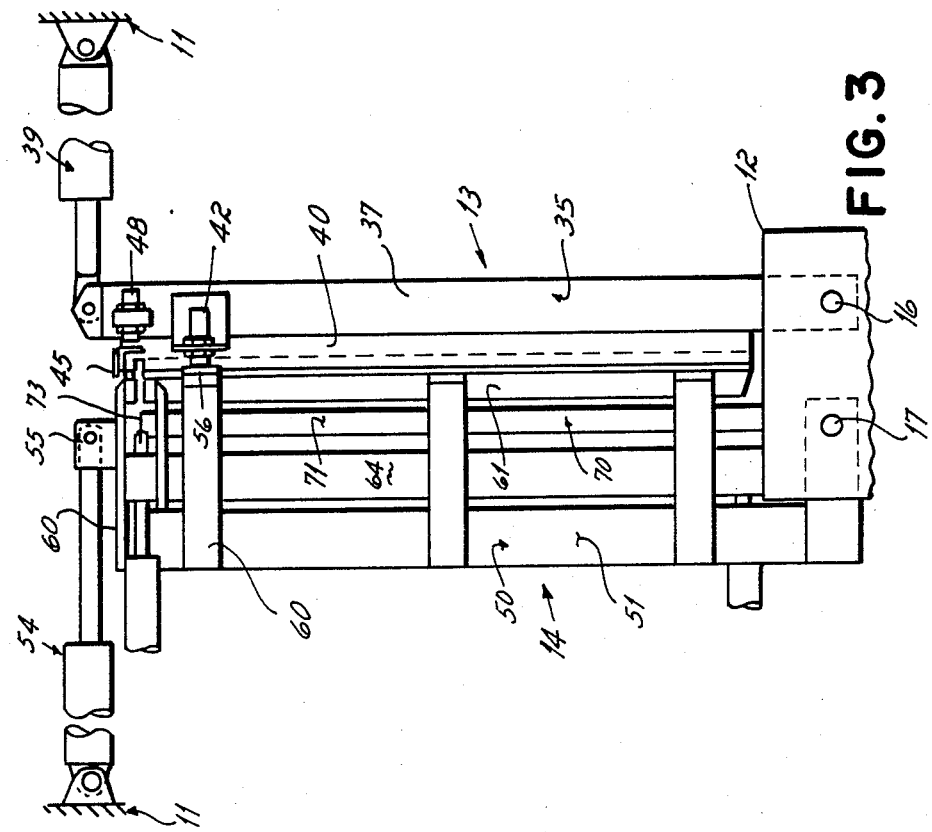
FIG. 3 is a view similar to FIG. 2 with the clamping jaw and sealing frame brought together.
Figure 2:
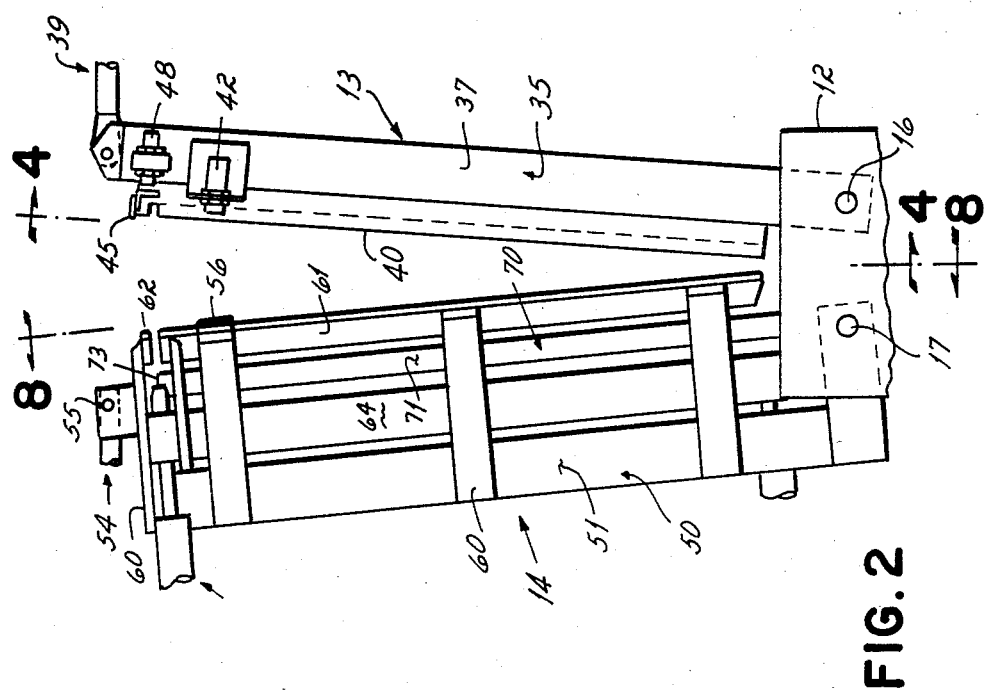
FIG. 2 is a side elevational view of the clamping jaw and sealing frame as seen in line 2—2 of FIG. 1.

The apparatus of the present invention is shown at 10 in FIG. 1. It includes a base 11, the base having brackets 12 to which a clamping jaw 13 and a sealing frame 14 are pivotally mounted. The clamping jaw 13 and sealing frame 14 are each in the form of an inverted U having their lower ends connected to rods 16 and 17, respectively, which are pivotally mounted on brackets 12.

Projecting up from the base 11 are four posts 20 which support a shroud 21 which surrounds the jaws 13 and 14. The shroud has a top surface 22 in which a transverse slot 23 is formed through which the film passes.

A roll 24 of film 25 is mounted on two of the posts 20. The film is festooned over upper idler rolls 26 and a dancer 27. A pair of drive rolls 28 and 29 provide a nip through which the film passes. The drive rolls are geared together so as to drive the two plies of film 25 without slippage between the respective plies. The drive system will be described in greater detail below.

The film, having been folded upon itself, presents two free edges at the operator side of the machine as shown at the right in FIG. 1. The film is passed between the jaws 13 and 14 with a predetermined length of film being measured by the drive for the rolls 28 and 29. When the film has come to rest, the jaws 13 and 14 close to clamp the film between them. When the jaws are closed, the heated knife cuts the film transversely at the top and vertically along the free edges adjacent the operator and forms seals where the film has been cut. The operator then inserts a product between the free edges of the film above the sealed line, (i.e., above top surface 22). The jaws open and a new length of film is passed between them. When the drive comes to rest, the jaws once again close and a similar cut and seal is formed along the free edges and transversely across the film. Thus, the package is formed. These operations are repeated to form additional packages.

THE CLAMPING JAW

With reference to FIGS. 2-7, the clamping jaw 13 includes a U-shaped frame 35 formed of two vertical members 36 and 37 and a horizontal top member 38. A piston and cylinder 39 are connected between the base 11 and the central portion of the transverse frame member 38. The cylinder has a stroke just sufficient to move the clamping jaw about 1/16 inch past vertical.

Figure 6:
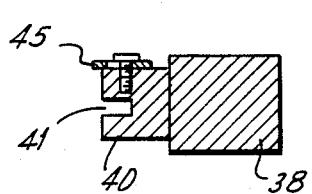
FIG. 6 is a cross section taken on line 6—6 of FIG. 4.
Figure 7:
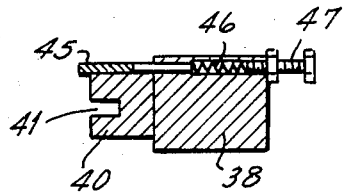
FIG. 7 is a cross section taken on line 7—7 of FIG. 5.
Figure 8:
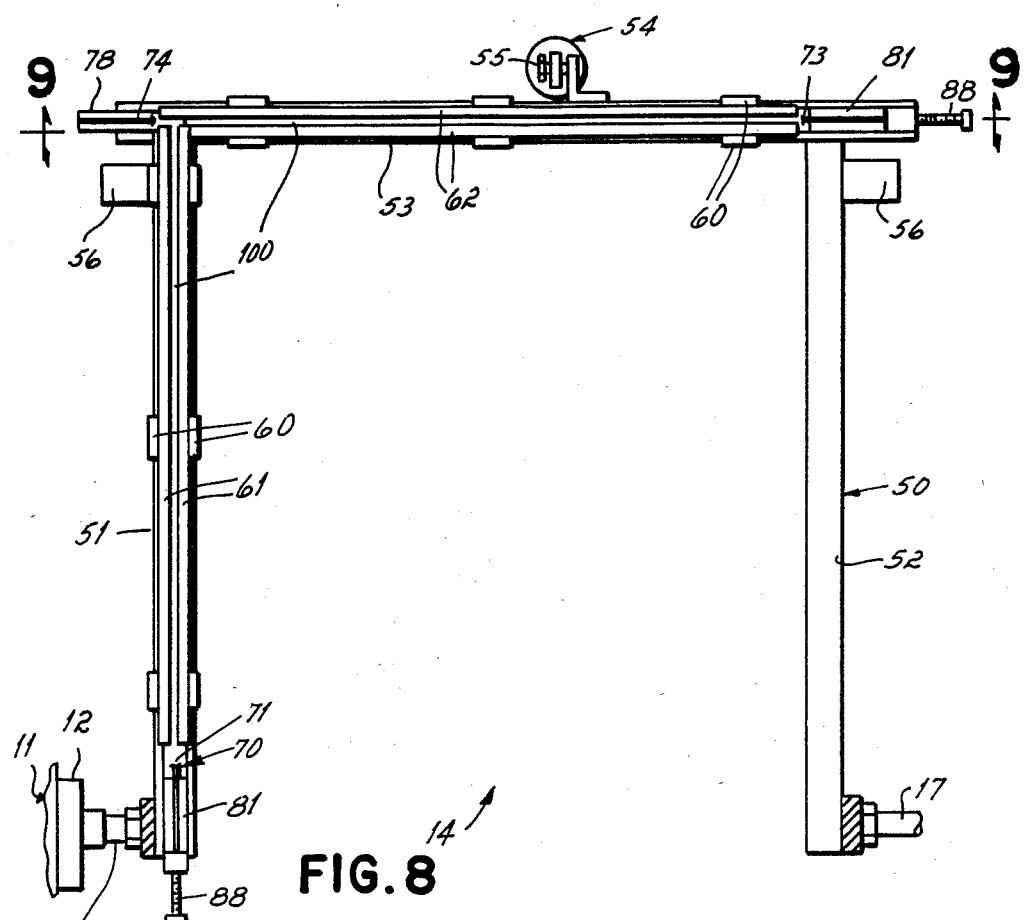
FIG. 8 is a view of the sealing frame as seen on line 8—8 of FIG. 2.

Channel members 40 are secured to the front surface of the vertical member 37 and the horizontal member 38 and present a slot 41 into which the hot knife passes during the sealing operation (see FIG. 6). A pair of proximity switches 42 are mounted on the vertical frame members 36 and 37 to provide a signal that the jaws have come together.

Figure 5:
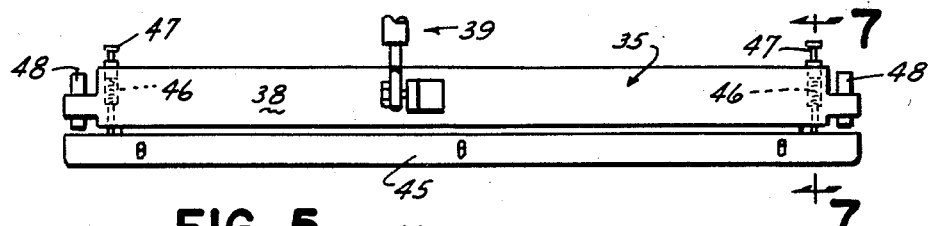
FIG. 5 is a view taken on line 5—5 of FIG. 4.
Figure 4:
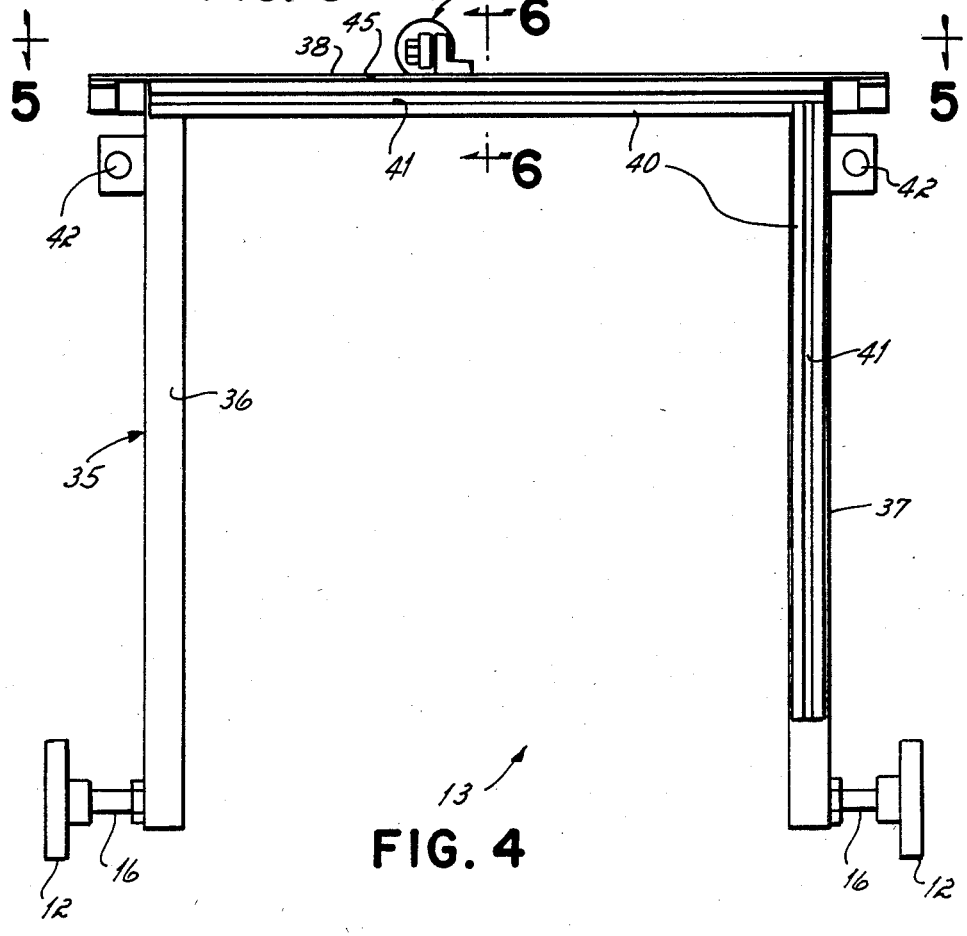
FIG. 4 is a view of the clamping jaw as seen on line 4—4 of FIG. 2.

As best seen in FIGS. 5, 6, a safety bar 45 is slidably-mounted on the horizontal leg of the channel-shaped members 40. The safety bar 45 is engaged by a pair of compression springs 46 mounted in bores in the horizontal frame member 38 and maintained in position by set screws 47. A pair of proximity switches 48 are mounted on the horizontal frame member 38. When the safety bar is caused to move rearwardly by engaging an obstruction, it actuates a proximity switch and reverses the air to the piston and cylinder 39, thereby opening up the jaws and preventing injury to the operator.

SEALING FRAME

With reference to FIGS. 2, 3, and 8-11, the sealing frame 14 has an inverted U-shaped main frame 50 consisting of two vertical legs 51 and 52 and an upper horizontal leg 53. A piston and cylinder 54 are connected at 55 to the center portion of the horizontal frame member 53. The piston has a stroke just sufficient to move the frame 1/16 inch past center. Each of the vertical frame members 51, 52 carry proximity actuators 56 which cooperate with the proximity switches 42 on the clamping jaw frame 35.

Three pairs of guide members 60 project horizontally toward the clamping jaw from the vertical frame member 51 and the horizontal upper frame member 53. Supported on the front edges of the guide bars 60 are spaced, parallel, vertical gripper bars 61. Similarly supported from the front edges of the guide bars on the horizontal frame member 53 are spaced parallel gripper bars 62. A vertical knife support 64 is slidably-mounted between guide bars 60 mounted on the frame member 51 and a top knife support 65 is slidably-supported between the guide bars 60 on the top frame member 53.

Figure 10:
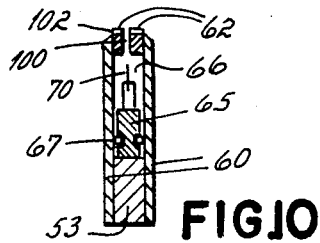
FIG. 10 is a cross section taken on line 10—10 of FIG. 9.

Referring to FIG. 10, each knife support 64, 65 has longitudinal slots 66 underlying the guide bars 60. These slots are packed with grease and roll pins 67 are inserted to permit the knife supports to reciprocate freely within the slots 66.

Figure 11:
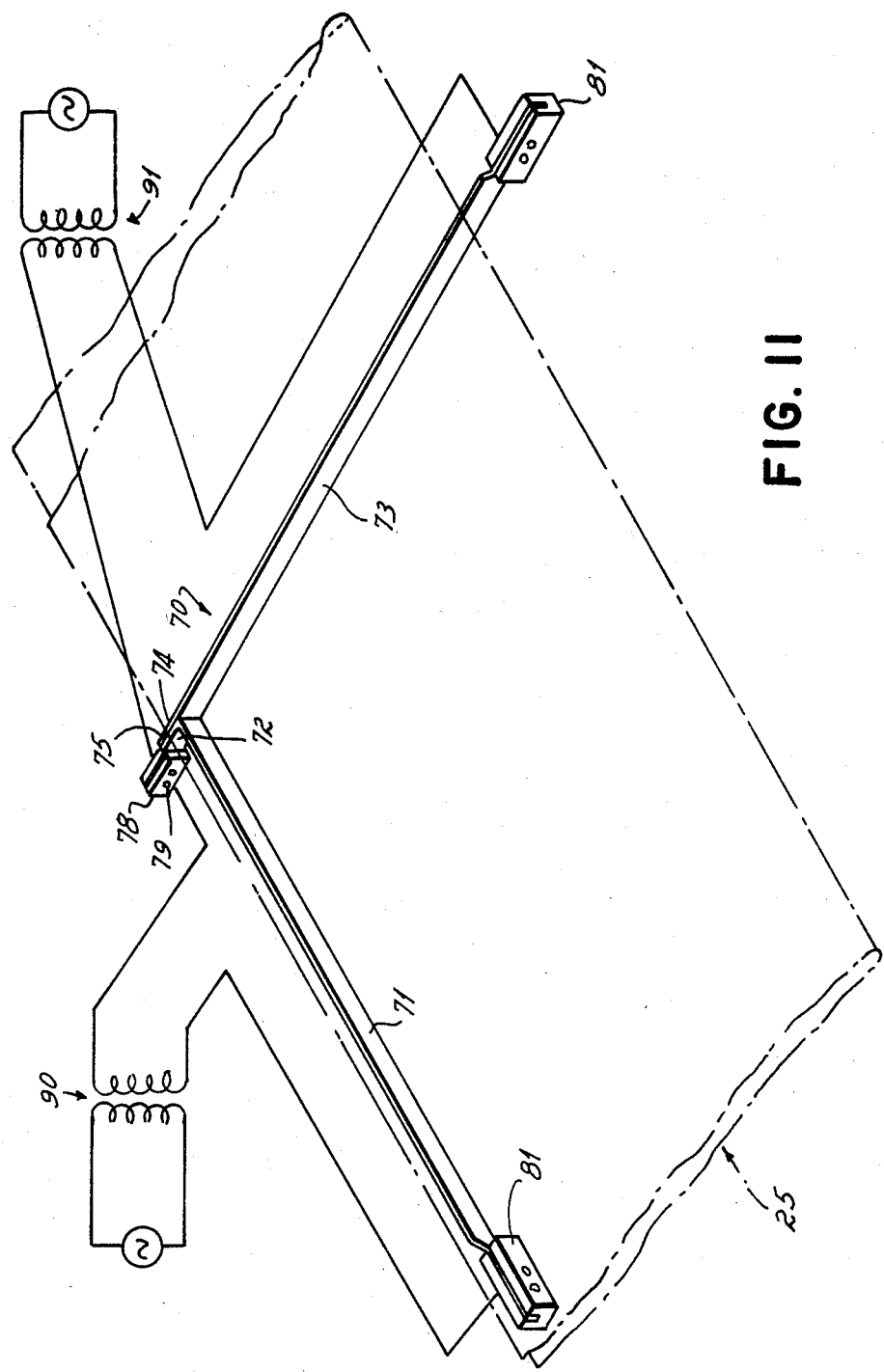
FIG. 11 is a schematic perspective illustrating a knife and electrical connections.

An inverted L-shaped knife 70 is mounted on the knife support. The knife is formed from two 304 stainless steel elements which are 0.625" wide and 0.015" thick. Referring to FIG. 11, the knife has a vertical element 71 having a right angle bend to leave a projecting portion 72. A horizontal element 73 has a projecting portion 74 about 1.5" long overlying the right angle beng 72. The elements are resistance-welded together at 75 which presents about a ¼ inch projection to the side of the knife. In the event the film drifts laterally from package to package, the vertical cuts wil be misaligned. The ¼ inch projection will insure a transverse cut through the vertical cut, thereby assuring that the scrap at the edge of the film will be severed from the packages.

Figure 9:
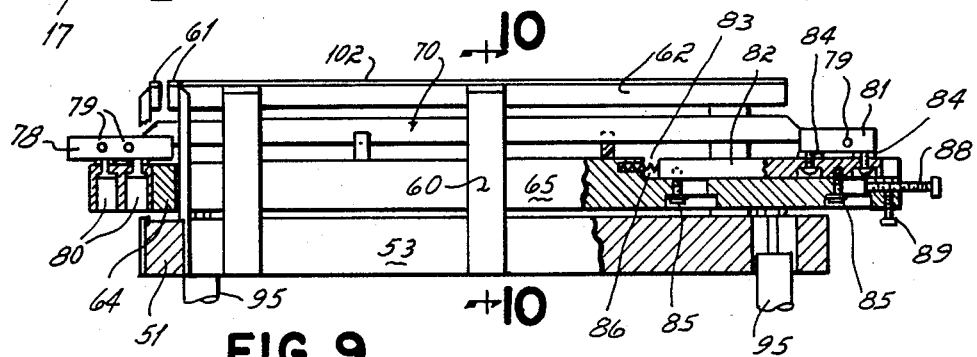
FIG. 9 is a cross section, partially in elevation, taken on line 9—9 of FIG. 8.

As shown in FIG. 11, the corner of the knife is mounted in a block 78, the block being fixed to the knife supports 64, 65 (FIG. 9). The corner of the knife is held in the block 78 by transverse set screws 79. Electrical connections to the corner are made through the bores 80 in the knife support.

The free ends of the knife are similarly mounted in blocks 81 at the lower corner of the support 64 and at the end of the upper support 65. As seen in FIG. 9, the block 81 is secured to a slide 82 mounted in a slot 83 in the knife support. Insulating washers 84 maintain the knife electrically insulated from the knife support. The slide is secured to the supports by shoulder bolts 85. A compression spring 86 is disposed in the slot 83 to urge the slides away from the corner of the knife and hence to place the knife elements 71 and 73 under tension.

A screw 88 at the end of each knife support bears against the slide and can be used to move the slide inwardly to compress the spring whenever a knife has to be replaced. A set screw 89 is provided to hold the screw on the knife support during normal operation when the screw is not tightened against the slide 82.

the knife is electrically connected to two transformers 90 and 91 (FIG. 11). Transformer 90 is connected across the element 71 and transformer 91 is connected across the element 73. It has been determined that a greater amount of heat is required to cut and seal the film in the longitudinal direction than the transverse direction and, hence, a higher voltage is applied across the element 71 than is applied across the element 73.

Three piston and cylinders 95 are connected between the knife supports and the frame elements at the extremities and at the corner, respectively, so as to move the knife toward the clamping jaw when the film is gripped between the two jaws. The knife 70 will pass through a slot 100 formed by the spaced, parallel gripper bars 61 mounted on the guide bars 60. Pads 102 may be secured to the front surfaces of those gripper bars to provide a good frictional clamping of the film.

FILM DRIVE

Figure 12:
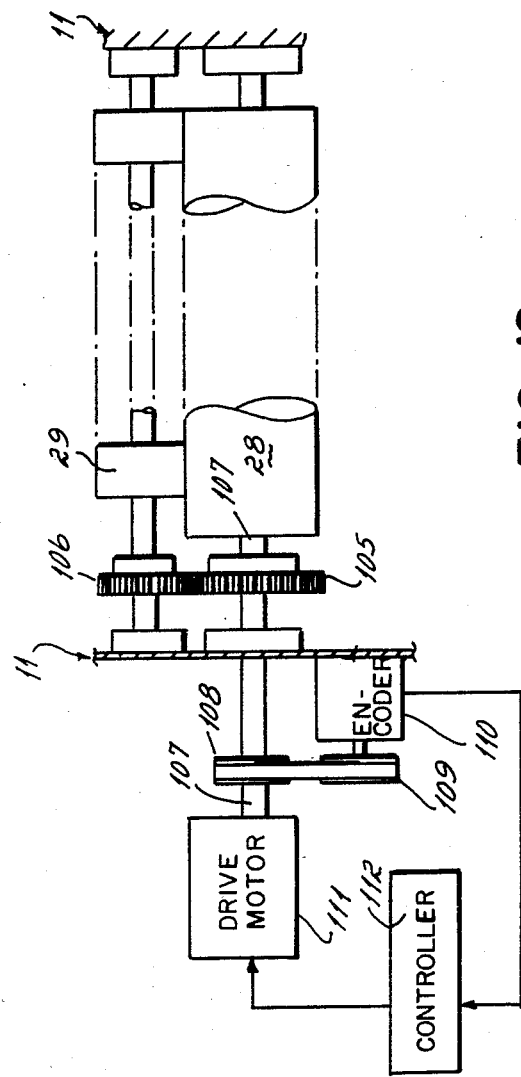
FIG. 12 is a diagrammatic view illustrating the drive for feeding the film.

Referring now to FIG. 12, the film is driven between the rolls 28 and 29. The rolls are geared together by gears 105 and 106 so as to provide the same circumferential speed and prevent any slipping of the two plies of film with respect to each other. The drive roller gear 105 is mounted on a shaft 107 having a pulley 108 on its end. A belt connects the pulley 108 to a pulley 109 connected to the shaft of the drive motor encoder 110.

A drive motor 111 is connected to the shaft 107 to rotate the rolls. A controller 112, in turn controlled by the encoder, operates the drive motor intermittently to feed the predetermined length of film required for the particular package.

Having described my invention, I claim:

1. In a vertical bagger having means for supplying a folded film into which a product can be inserted, a clamping, cutting and sealing assembly comprising,
   a base,
   a generally vertical inverted U-shaped clamping jaw pivoted at one end to said base,
   a generally vertical inverted U-shaped sealing frame pivoted to said base adjacent said clamping jaw,
   an L-shaped sealing knife mounted on said sealing frame for reciprocation toward and away from said clamping jaw,
   said sealing knife having a vertical leg and a horizontal leg,
   power means for applying a voltage to said sealing knife to heat said knife,
   means for moving said clamping jaw and sealing frame together,
   means for moving said sealing knife toward said clamping jaw when said clamping jaw and sealing frame are together, said sealing knife cutting said film vertically and transversely and forming a transverse seal and a vertical seal along the free edges of said film to complete the formation of a package.

2. Apparatus as in claim 1 in which said voltage-applying means comprises,
   a first transformer applying voltage to said transverse leg,
   and a second transformer applying a different voltage to said vertical leg.

3. Apparatus as in claim 1 further comprising,
   a knife support reciprocably mounted in said sealing frame,
   said sealing knife having a corner fixed to said knife support,
   spring means mounting the ends of said sealing knife to said knife support to place each said leg under tension, thereby accommodating thermal expansion and contraction of said knife.

4. Apparatus as in claim 1 further comprising,
   a knife support reciprocably mounted in said sealing frame,
   a plurality of pneumatic pistons and cylinders mounted between said knife support and said frame and constituting said means for moving said knife.

5. Apparatus as in claim 1 further comprising,
   said clamping jaw having a slot opposite and aligned with said knife for receiving said knife when it is brought into sealing position with respect to said clamping jaw,
   said clamping jaw having a clamping surface on each side of said slot,
   a gripper bar mounted on said sealing frame and being substantially coextensive with said knife, said gripper bar having a slot through which said knife passes, said slot being aligned with the slot in said clamping jaws, said gripper bar having clamping surfaces alongside said slot to cooperate with the clamping surfaces on said clamping jaw to clamp said film as it is cut and sealed by said knife.

6. Apparatus as in claim 1 further comprising,
   a safety bar reciprocably mounted across the top of said clamping jaw,
   spring means normally urging said safety bar to a position in which said bar projects beyond the clamping jaw toward said sealing frame,
   a switch operable upon movement of said safety bar away from said sealing frame,
   means connecting said switch to said moving means of said clamping jaw and sealing frame to prevent their closing when said switch is operated, thereby preventing injury to an operator having a limb inadvertently placed between said jaw and frame as they are closing.

7. Apparatus as in claim 1 further comprising a film feed comprising,
   an upper feed roll and a lower feed roll, creating between them a nip through which a two-ply film is passed,
   gears interconnecting said feed rolls to drive them in synchronizm,
   a drive motor connected to said rollers to rotate them and to feed the film,
   and encoder means connected to said drive motor to energize said motor only for a predetermined interval, thereby feeding only a predetermined length of film.

8. Apparatus as in claim 1 in which said L-shaped knife has a transverse projection at its corner to cut across the vertical cut made in the film.

9. Apparatus as in claim 1 in which said knife is about 0.015 inch thick and 0.625 inch wide.

* * * * *